United States Patent
Dixit et al.

(10) Patent No.: US 9,037,913 B2
(45) Date of Patent: May 19, 2015

(54) DYNAMIC EVENT GENERATION FOR USER INTERFACE CONTROL

(75) Inventors: Deepraj Sitaram Dixit, Srillingampally (IN); Varadarajan Thiruvillamalai, Miyapur (IN); Singireddy Neeraja Reddy, Kondapur (IN); Venkatesh Sargunesan, Miyapur (IN); Siddhartha Pandey, Hafeezpet (IN); Vishnupriyan Radhamanalan, Kondapur (IN); Mathew Aniyan, Kondapur (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 13/459,255

(22) Filed: Apr. 30, 2012

(65) Prior Publication Data

US 2013/0290875 A1     Oct. 31, 2013

(51) Int. Cl.
  *G06F 11/00* (2006.01)
  *G06F 11/36* (2006.01)

(52) U.S. Cl.
  CPC ................................ *G06F 11/3664* (2013.01)

(58) Field of Classification Search
  CPC ................................................ G06F 11/36
  USPC ................ 714/38.1, 37, 4.1; 715/760, 762; 717/124, 126
  See application file for complete search history.

(56) References Cited

U.S. PATENT DOCUMENTS

| | | | |
|---|---|---|---|
| 7,389,223 B2 * | 6/2008 | Atkin et al. ....................... | 704/8 |
| 7,505,817 B2 * | 3/2009 | McDaniel et al. .............. | 700/18 |
| 7,574,625 B2 | 8/2009 | McGlinchey et al. | |
| 7,752,501 B2 * | 7/2010 | Bak ........................... | 714/38.14 |
| 8,032,790 B2 | 10/2011 | Chopra et al. | |
| 2002/0077807 A1 * | 6/2002 | Davis et al. ....................... | 704/8 |
| 2009/0132994 A1 * | 5/2009 | Doggett et al. ............... | 717/106 |
| 2010/0083239 A1 | 4/2010 | Chouinard et al. | |
| 2011/0004868 A1 | 1/2011 | Bharadwaj | |
| 2011/0041117 A1 | 2/2011 | Grechanlk et al. | |

OTHER PUBLICATIONS

Miao, et al., "An FSM based GUI Test Automation Model", Retrieved at <<http://ieeexplore.ieee.org/stamp/stamp.jsp? tp= &amumber=5707766>>, CARV, Dec. 7, 2010, pp. 120-126.

\* cited by examiner

*Primary Examiner* — Dieu-Minh Le
(74) *Attorney, Agent, or Firm* — Kevin Sullivan; Kate Drakos; Micky Minhas

(57) ABSTRACT

A method includes detecting user interaction with a first control of a user interface, identifying a property of the first control, and storing data representing the property of the first control in a memory. The method further includes dynamically generating an event for the first control by use of the property of the first control upon detecting user interaction with a second control and upon detecting an absence of an event corresponding to the first control being generated with respect to a user interface test program. An action responsive to the dynamically generated event is stored in an event log.

20 Claims, 4 Drawing Sheets

DYNAMIC EVENT GENERATION FOR USER INTERFACE CONTROL

BACKGROUND

When a user of a software program identifies an error, or a potential error, in software being tested, the user typically records information regarding the identified potential error. In order for a developer to correct the identified error, it is helpful for the user that identified the error to provide a complete set of reproduction steps to enable the developer to recreate the identified error. Certain software tools provide a recording capability that allows testers to automatically capture such error reproduction steps. Such software tools monitor events related to user interactions with user interface controls (e.g., controls of a graphical user interface (GUI)) to automatically generate the reproduction steps.

However, certain controls sometimes disappear from a user interface after an action, and in this case the monitoring software does not fire an event for such action. In this scenario, the tool for automatically recording reproduction steps of an error may not be able to record all actions related to an identified error condition. When a user interface control disappears, or does not fire after a user action, a set of captured reproduction steps related to an identified error associated with the control may be incomplete, leading to a user interface error that is difficult to resolve.

SUMMARY

The present disclosure provides a mechanism to dynamically generate events, such as when user interface controls disappear after a user interaction. The dynamically generated events are captured and may be used to reproduce a detected software error identified by a user. Providing a complete set of reproduction steps for an identified software error improves an ability of a developer to fix the software error.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
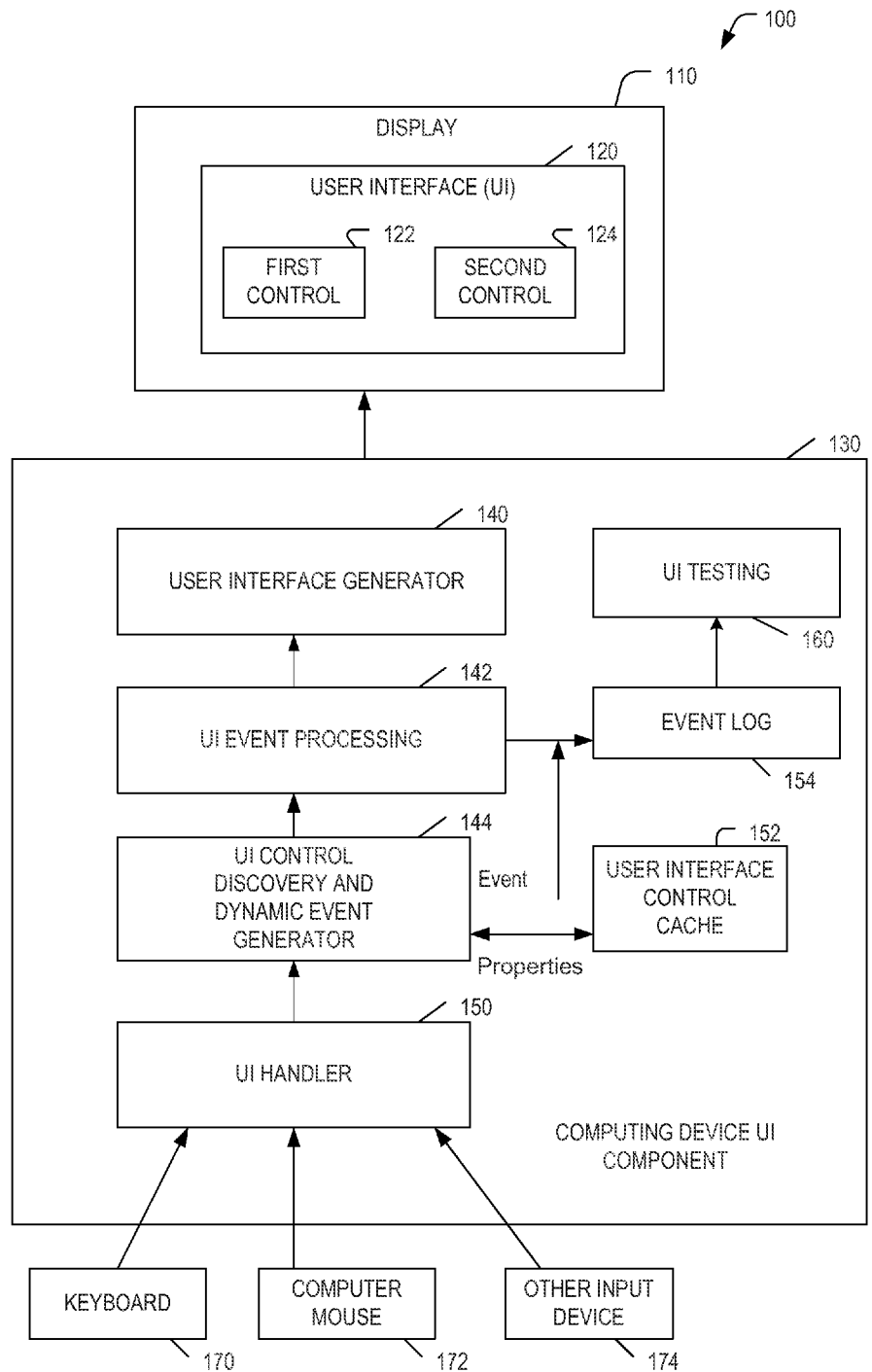
FIG. 1 is a block diagram of a particular embodiment of a computing system that includes a user interface component with a user interface control discovery and dynamic event generator.

In many scenarios, events generated by a user action with respect to a user interface of a computer system are not received or processed by a test automation recording tool. An example of a test automation tool is the Microsoft® Visual Studio® (trademark Microsoft Corporation, Redmond, Wash.) user interface automation recording framework. Such scenarios often relate to user interface controls. Examples of such user interface controls include a login button that when selected navigates towards another page, a link that when selected navigates to another website, and a country combo box in which an item is selected. To enhance the recording capability of events by the test automation tool, a system and method are disclosed that identify a mechanism by which a set of properties are associated with each control of the user interface. A user interface automation framework cache stores these properties before sending a mouse/keyboard or touch gesture input to a control of the user interface. The properties captured are then compared with their values after the mouse/keyboard or touch gesture action is completed. If the properties have changed and the user interface automation recording framework has not received an event notification, a dynamic event is fired on behalf of the control. Firing the dynamic event in such situations captures actions that may be part of reproduction steps listed in a report related to a detected software bug. The disclosed system and method may capture events, not otherwise captured, to add information to reproduction steps related to detected software errors. As a result, developers have further information to assist in software debugging of user interfaces that include user interface controls.

In a particular embodiment, a system and method are used in connection with testing of a user interface. The system and method identify a particular widget of the user interface that a user is interacting with and determine that there is evidence of a change in the widget. A detected difference in specific properties of the widget triggers an event associated with an anticipated change in the widget. The widget may be one user interface (UI) control or more than one UI control working together to allow a user to control sufficient granular aspects in a software application. Widgets may be primitive or complex. For example, a primitive widget may be a button or a text box. Examples of more complex widgets include a combo box or a container. Widgets may be defined and configured using a markup language, such as XML. Widgets may be identified using a simple query on a set of properties of a particular user interface control. In addition, a widget can include a set of properties of target elements and a list of properties that may be monitored. Such properties are monitored and tracked during a lifetime of the widget and are used to fire dynamic events. It should be noted that widgets can be nested such that a widget chain may be traversed from an outer section to an inner section to find which widget should trigger a particular dynamic event.

Referring to FIG. 1, a particular illustrative embodiment of a computing system 100 is shown. The computing system 100 includes a computing device user interface component 130 that may be part of a computer, or another computing device, that is coupled to a display 110. The display 110 includes a representative user interface 120 that displays one or more controls, such as a first control 122 and a second control 124. Each of the controls 122, 124 may be any control suitable for display by a user interface, such as a graphical user interface (GUI). Examples of UI controls include a button, a text box, a list, a link, or other navigation elements that may he presented by the display 110. in a particular embodiment, the first control 122 is a navigation user interface element (e.g., a universal resource locator (URL) link to a second web page) of the user interface 120, and the user interface 120 is part of or associated with a first web page. The second control 124 may be a control of a second user interface of a second web page. The second web page may be hosted by a different server than the first web page.

The computing device user interface component 130 includes a user interface handler 150, a user interface control discovery and dynamic event generator 144, a user interface event processing component 142, and a user interface generator 140. The computing device user interface component 130 also includes a user interface testing program 160, a user interface control cache 152, and an event log 154. The computing device user interface component 130 is responsive to user interface devices, such as a keyboard 170, a computer mouse 172, or other input device 174. For example, the other input device 174 may be a gesture control device or a touch screen.

During operation, the user interface handler 150 may receive input from any of the user input devices 170-174. Responsive to receiving an input from a user input device, the user interface handler 150 may detect an event and may send the event to the user interface (UI) event processing component 142. The user interface control discovery and dynamic event generator 144 monitors events generated by the user interface handler 150 and may detect particular events that are to be monitored. The user interface control discovery and dynamic event generator 144 may detect when one of the events from the user interface handler 150 is a user interface control command or action. Upon detecting a user interface control command or action, such as a user mouse click of the first control 122 (e.g., a user mouse click of a button on the user interface 120), the user interface control discovery and dynamic event generator 144 may generate and store properties of the particular user interface control element (e.g., first control 122) and may cache such properties, and a selection of the user, in the user interface control cache 152. The user input is processed by the user interface event processing component 142. After processing by the user interface event processing component 142, the user interface generator 140 may take action with respect to the detected user input. For example, the user interface generator 140 may control the user interface 120 to take an action with respect to the user input.

During further operation, a user interaction with the second control may be detected. For example, the user interface handler 150 may detect another input from one of the user input devices 170-174. Such input may be monitored by the user interface control discovery and dynamic event generator 144 and processed by the user interface event processing component 142. An example of a user input may be a user input to take an action with respect to the second control 124. Upon detecting a user interaction with the second control 124 and upon detecting that no event has been generated or stored for use by the UI test program 160 for the first control 122, the user interface control discovery and dynamic event generator 144 may dynamically generate an event for the first control 122 by using the cached information (e.g., properties and selection) retrieved from the user interface control cache 152. The UI control discovery and dynamic event generator 144 may dynamically generate an event and add the event to other events of an event stream provided by the UI event processing component 142, resulting in the dynamic generated event being stored in the event log 154.

Thus, an event may be dynamically generated and an action may be logged based on the dynamical generated event. The user interface testing program 160 may be used by a user of the computing device UI component 130 in order to report a detected software error with respect to the user interface 120. The UT testing program 160 may retrieve events logged at the event log 154 to report a set of reproduction steps related to a detected software error to enable a developer to recreate the detected software error for the debugging of the error.

The UI control discovery and dynamic event generator 144 may detect when a particular user control has semantically changed its state to detect situations where events related to the user control may not otherwise be triggered. For example, in cases where a control causes navigation to a different screen, an event may not be triggered. For example, no event may be triggered because the control that is responsible for triggering the event is not within the second screen due to the navigation. Another case where events are not triggered is when a test automation program implementation is incomplete. An example of art incomplete implementation is where a user interface control is built on a multi-layered stack and a bug in any of the underlying layers of the multi-layered stack causes the event to not to be forwarded to a user interface automation client. The UI control discovery and dynamic event generator 144 detects a change of a user interaction from a first control to a second control and may dynamically generate events with respect to such detected chances. As such, the UI control discovery and dynamic event generator 144 is configured to dynamically generate events with respect to potential user interface control errors not otherwise captured by a user interface automated testing and monitoring application.

Figure 2:
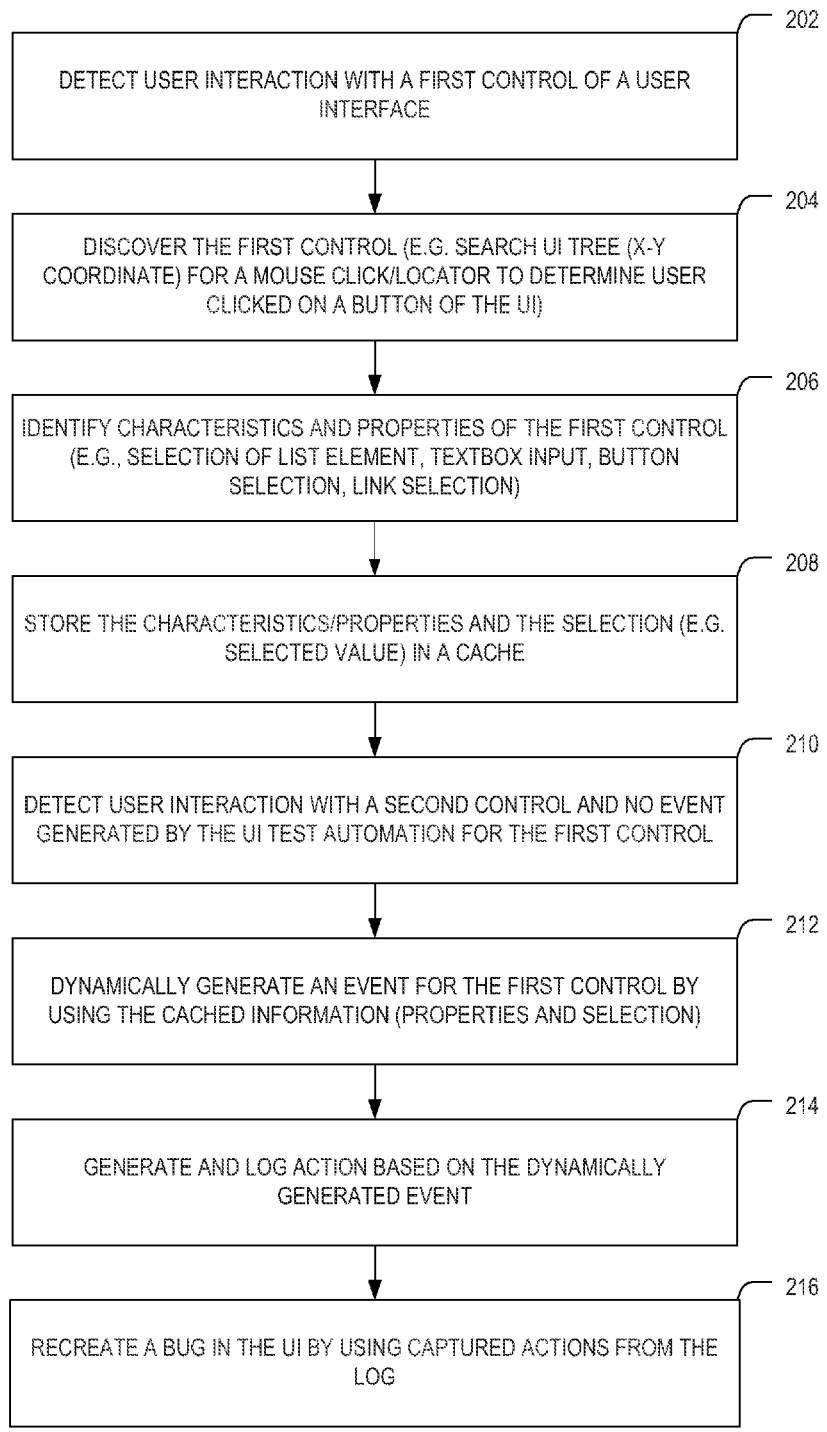
FIG. 2 is a flow chart that illustrates a particular embodiment of a method of dynamically generating events associated with user interface controls.

Referring to FIG. 2, a particular illustrative embodiment of a method of dynamically generating events associated with a user interface control is illustrated. The method includes detecting user interaction with a first control of the user interface, at 202. For example, the 131 control discovery and dynamic event generator 144 is responsive to the handler 150 to detect user inputs and may detect user interaction with the first control 122 of the user interface 120. The method further includes discovering the first user interface control, at 204. For example, the first user interface control may be discovered by searching a user interface tree (e.g., X-Y coordinates) for a mouse click/locator to determine that a user clicked on a control (e.g., a button) of the user interface.

The method further includes identifying characteristics and properties of the first control, at 206. An example of characteristics and properties of the first control may include selection of a list element, a selection of a button, a text box input, a link selection, or other action related to a control of the user interface. The method further includes storing the characteristics and properties and the selection (e.g., a selected or input value) in a cache, at 208. For example, the characteristics and properties of a particular user control, such as data that represents a property of the first control 122, and the selection (e.g., an input value) of the particular user control, or data that represents the selection, may be stored in the user interface control cache 152 of FIG. 1, An example of characteristics may be a list of elements, such as a combo box, and art example of a selection may be a particular element in the list of elements. An example of a combo box may include a list of multiple states and a particular selection may be the state of Washington.

The method further includes detecting a user interaction with a second control and detecting that no event has been generated for use by a UI test automation program for the first control, at 210. For example, the UI control discovery and dynamic event generator 144 of FIG. 1 may detect user interaction with a second control, such as the second control 124. The UI control discovery and dynamic event generator 144 may also detect that no event has been generated by the UI event processing component 142 for the first control (i.e., first control 122). When no event has been generated in response to the detected user interaction, the UI control discovery and dynamic event generator 144 determines that an event should have been generated and dynamically generates the event, which is stored in the event log 154 for subsequent use during potential software error reproduction and debugging.

The method further includes dynamically generating an event for the first control by using the cached information (e.g., the properties and the selection), at 212. For example, the properties and the election associated with the first control 122 may be retrieved from the user interface control cache 152 of FIG. 1, and the UI control discovery and dynamic event generator 144 may dynamically generate an event based on or responsive to the information retrieved from the user interface control cache 152. The method further includes generating and logging an action based on a dynamically generated event, at 214. For example, the dynamically generated event (e.g., the properties of the first control 122 and the selection associated with the first control 122) and a corresponding action (e.g., a user input or a mouse click) may be logged in the event log 154.

During a subsequent use of a testing program, such as for software debugging of a user interface, a reported software error in the user interface may be recreated by using captured actions stored in the event log, at 216. For example, the user interface testing program 160 of FIG. 1 may be used to recreate a detected software error in the user interface 120 by using captured actions and other information stored in the event log 154. Thus, additional information related to reproduction steps may be captured in the event log 154 (e.g., events generated by the UI control discovery and dynamic event generator 144) and such additional information may be used by the testing program 160 to improve software debugging of the user interface 120.

Figure 3:
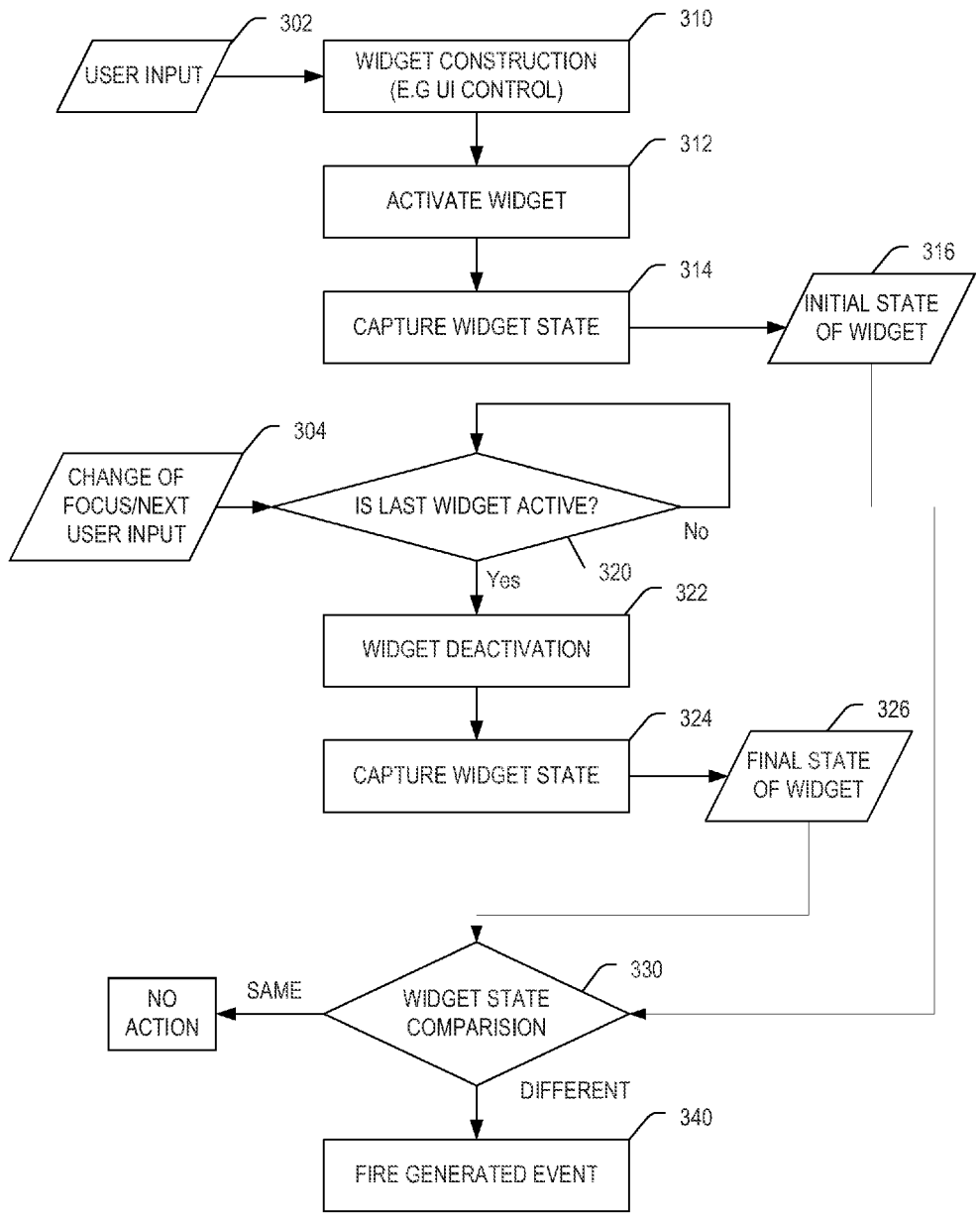
FIG. 3 is a flow chart that illustrates a particular embodiment of a method of dynamically generating events associated with use of widgets.

Referring to FIG. 3, another particular illustrative embodiment of a method of dynamically generating events with respect to controls of a user interface is shown. The method includes receiving a user input 302 at a widget construction component 310. A widget may include one or more user interface controls working together to allow a user to control aspects in a software application. Examples of user controls include the first and second control 122, 124 of FIG. 1 of the user interface 120. The method further includes activating the widget, at 312, and capturing a widget state, at 314. The captured widget state corresponds to an initial state of the widget 316. An example of a captured widget state includes properties and selection information that are stored within the user interface control cache 152 of FIG. 1.

During subsequent interaction by a user with the user interface, a change of focus or a next user input is detected, at 304. If the previous widget remains active, as determined at 320, then the widget is deactivated, at 322, and the state of the deactivated widget is captured, at 324, generating a final state of the widget 326. The initial state of the widget 316 is compared to the final state of the widget 326 at 330. If the initial state of the widget 316 is the same as the final state of the widget 326, at 330, then no action is taken. However, if the initial state of the widget 316 is different than the final state 326, then an event corresponding to the widget is dynamically generated, at 340. For example, if the UI control discovery and dynamic event generator 144 of FIG. 1 determines that a state of a particular control as determined by information received from the UI control cache 152 does not match a state of a subsequently detected UI control, then the UI control discovery and dynamic event generator 144 may determine that an event should be generated and may generate the event which is stored in the event log 154. Thus, a method of dynamically generating events to supplement information captured or used by a UI automated recording and monitoring tool has been disclosed.

Figure 4:
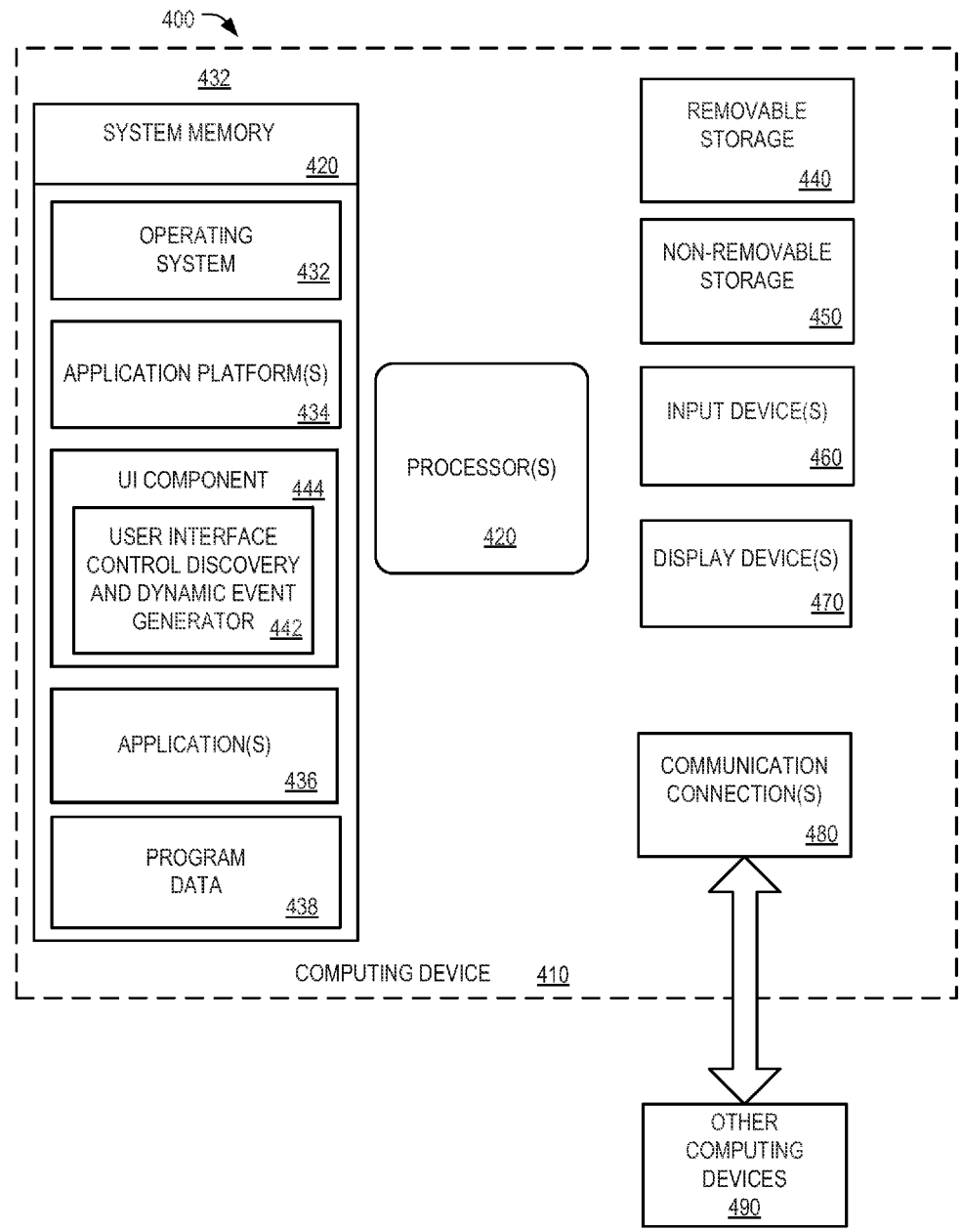
FIG. 4 is a block diagram that illustrates a computing environment including a computing device to support systems, methods, and computer programs as illustrated in FIGS. 1-3.

FIG. 4 is a block diagram illustrating a particular embodiment of a computing environment 400 including a computing device 410 to support systems, methods, and computer program products as described in FIGS. 1-3. In an illustrative embodiment, the computing device 410 may include or be used to implement the computing system 100 that includes the computing device user interface component 130. The computing device 410 includes at least one processor 420 and a system memory 430. Depending on the configuration and type of the computing device 410, the system memory 430 may be volatile (such as random access memory or "RAM"), non-volatile (such as flash memory and similar memory devices that maintain stored data even when power is not provided), or some combination of the two. The system memory 430 typically includes an operating system 432, one or more application platforms 434, one or more applications 436, and may include program data 438 associated with the one or more applications 436.

The applications 436 may include the user interface testing application 160, the user interface generator application 140, and other applications described with respect to the computing device UI component of 130 of FIG. 1.

The system memory 430 includes the UI component 444 that includes the UI control discovery and dynamic event generator 442. In a particular illustrated embodiment, the UI component 444 may be the computing device UI component 130 of FIG. 1, and the user interface control discovery and dynamic event generator 442 may be the UI controlled discovery and dynamic event. generator 144 of FIG. 1.

The computing device 410 may also have additional features or functionality. For example, the computing device 410 may also include removable and/or non-removable data storage devices such as magnetic disks, optical disks, tape, compact disks (CD), digital versatile disks (DVD), and standard-sized or miniature flash memory cards. The data storage devices are illustrated in FIG. 4 by removable storage 440 and non-removable storage 450.

The computing device 410 may also include storage media. The storage media may include volatile and/or non-volatile storage implemented in any method or technology for storage of information such as computer-readable instructions, data structures, program components, or other data. The storage media may include, but is not limited to, RAM, ROM, electrically erasable programmable read-only memory (EEPROM), flash memory and/or other memory technology, or any other medium that can be used to store information and that can be accessed by the computing device 410.

The computing device 410 may also have input device(s) 460, such as a keyboard, mouse, pen, voice input device, touch input device, etc., which may include one or more of the input devices 170, 172 and 174 of FIG. 1. Output device(s) 470, such as a display, speakers, printer, etc, may also be included. The display device 470 may be the display 110 of FIG. 1. The computing device 410 also contains one or more communication connections 480 that allow the computing device 410 to communicate with other computing devices 490 over a wired or a wireless network. The other computing devices 490 may include databases, a remote computer server, or a network. It will he appreciated that not all of the components or devices illustrated in FIG. 4 or otherwise described in the previous paragraphs are necessary to support embodiments as herein described. The illustrations of the embodiments described herein are intended to provide a general understanding of the structure of the various embodiments.

The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    detecting user interaction with a first control of a user interface;
    identifying a property of the first control, the property related to control of the user interface;
    storing data representing the property of the first control in a memory;
    detecting use of the first control via the user interface;
    detecting an absence of an event corresponding to the property of the first control;
    generating a dynamically generated event corresponding to the property of the first control; and
    storing the dynamically generated event in an event log.

2. The method of claim 1, further comprising recreating a software error in the user interface by using actions associated with the dynamically generated event and stored in the event log.

3. The method of claim 1, further comprising detecting a selection associated with the first control and storing data representing the selection in the memory.

4. The method of claim 1, wherein the memory is a user interface control cache.

5. The method of claim 1, wherein the first control is a navigation user interface element of the user interface, the user interface comprising a graphic user interface of a first web page, and wherein the absence of an event corresponding to the property of the first control is detected upon use of a second control, wherein the second control is a user interface element of a second user interface associated with a second web page.

6. The method of claim 5, wherein the navigation user interface element is a universal resource locator (URL) to the second web page.

7. A method comprising:
    receiving user input related to a first widget;
    activating the first widget and capturing an initial state of the first widget;
    detecting a second user input indicating a selection of an item other than the first widget;
    deactivating the first widget responsive to the second user input;
    determining a final state of the first widget upon deactivation based on information received from a user interface cache;
    performing a comparison of the initial state of the first widget to the final state of the first widget; and
    dynamically generating an event related to a user interface testing program based on the comparison indicating a difference between the initial state and the final state of the first widget.

8. The method of claim 7, wherein the first widget is a first control of a user interface.

9. The method of claim 8, wherein the first control represents a button, a list, a combo box, or a text input.

10. The method of claim 7, wherein the second user input indicates selection of a second widget.

11. The method of claim 7, wherein the second user input indicates a change of focus by a user from a first user interface to a second user interface.

12. The method of claim 7, wherein the event is dynamically generated by a user interface control discovery and dynamic event generator that is coupled to a user interface control cache and to an event log.

13. The method of claim 12, wherein the user interface control discovery and dynamic event generator is part of a user interface component of a computing system.

14. The method of claim 13, wherein the user input is detected by a user interface handler of the user interface component.

15. A data storage device including instructions that are executable by a processor to:
- detect user interaction with a first control of a user interface;
- identify a property of the first control, the property related to control of the user interface;
- store data representing the property of the first control in a cache;
- detect use of the first control via the user interface;
- detect an absence of an event corresponding to the property of the first control;
- generate a dynamically generated event corresponding to the property of the first control; and
- store an action based on the dynamically generated event in an event log, wherein the action relates to a set of reproduction steps recorded by a user interface testing tool to reproduce an identified error relating to the user interface.

16. The data storage device of claim 15, wherein a user interface test program is executable to recreate a software error in the user interface by executing the reproduction steps.

17. The data storage device of claim 15, wherein a selection associated with the user interaction with the first control is stored in the cache.

18. The data storage device of claim 15, wherein the first control is a navigation user interface element of the user interface, the user interface comprising a graphic user interface of a first web page, and wherein the detecting of the absence of the event is responsive to use of a second control of a second graphic user interface associated with a second web page.

19. The data storage device of claim 18, wherein the navigation user interface element is a universal resource locator (URL) link.

20. The data storage device of claim 15, wherein the event log and the cache are components within a computing device that includes a user interface handler, a user interface control discovery and dynamic event generator, a user interface processing element, and a user interface generator.

\* \* \* \* \*